(12) United States Patent
Zhang

(10) Patent No.: US 10,570,865 B2
(45) Date of Patent: Feb. 25, 2020

(54) FUEL INJECTOR WITH VARIABLE FLOW DIRECTION

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 512 days.

(21) Appl. No.: 15/345,825

(22) Filed: Nov. 8, 2016

(65) Prior Publication Data

US 2018/0128228 A1    May 10, 2018

(51) Int. Cl.
*F02M 61/18* (2006.01)
*F02B 17/00* (2006.01)
*F02D 41/40* (2006.01)

(52) U.S. Cl.
CPC ....... *F02M 61/1806* (2013.01); *F02B 17/005* (2013.01); *F02D 41/402* (2013.01); *F02M 61/184* (2013.01); *F02M 61/1813* (2013.01); *F02M 61/1833* (2013.01); *Y02T 10/44* (2013.01)

(58) Field of Classification Search
CPC .. F02M 61/042; F02M 61/18; F02M 61/1806; F02M 61/1813; F02M 61/182; F02M 61/1826; F02M 61/1833; F02M 61/184; F02M 61/1846; F02M 61/1866; F02M 61/1893; F02D 41/402; F02B 17/005; F02B 23/0669
USPC ............... 123/299; 239/533.12, 533.2, 533.3
See application file for complete search history.

(56) References Cited

U.S. PATENT DOCUMENTS

| | | | | |
|---|---|---|---|---|
| 4,096,995 A | * | 6/1978 | Klomp | F02B 17/005 239/533.8 |
| 4,269,360 A | * | 5/1981 | Kopse | F02M 61/06 239/533.8 |
| 4,339,080 A | * | 7/1982 | Kopse | F02M 45/086 239/533.3 |
| 4,758,169 A | * | 7/1988 | Steiger | F02M 45/08 239/446 |

(Continued)

FOREIGN PATENT DOCUMENTS

| | | | | |
|---|---|---|---|---|
| DE | 3738558 A1 | * | 7/1988 | ......... F02M 51/0671 |
| EP | 1467087 A1 | * | 10/2004 | ............. F02M 61/08 |

(Continued)

OTHER PUBLICATIONS

Zhang, Xiaogang, "Methods and Systems for a Fuel Injector Assembly," U.S. Appl. No. 14/978,801, filed Dec. 22, 2015, 69 pages.

(Continued)

*Primary Examiner* — John M Zaleskas
(74) *Attorney, Agent, or Firm* — Geoffrey Brumbaugh; McCoy Russell LLP

(57) ABSTRACT

A fuel injector and method are disclosed wherein an injector body defines a cavity and passages from an inlet at the cavity through an outside surface of the injector body. Each passage may have a first inner contour at a first angle and a second inner contour at a second angle. An injector pin with a fuel pass-though volume may be movable within the cavity to selectively overlap an outlet of the pass-through volume with an inlet of the passages to selectively direct fuel in varying quantities along the first second inner contours.

19 Claims, 7 Drawing Sheets

(56) References Cited

U.S. PATENT DOCUMENTS

| | | | | |
|---|---|---|---|---|
| 4,773,374 | A * | 9/1988 | Kiuchi | F02M 51/0678 123/470 |
| 4,958,771 | A * | 9/1990 | Klomp | F02M 61/08 239/453 |
| 5,016,820 | A * | 5/1991 | Gaskell | B23H 9/00 239/533.12 |
| 5,163,621 | A | 11/1992 | Kato et al. | |
| 5,282,577 | A * | 2/1994 | Neitz | F02M 45/08 137/625.37 |
| 5,540,388 | A * | 7/1996 | Sasao | F02M 51/0678 239/417.3 |
| 5,588,412 | A * | 12/1996 | Nozaki | F02M 61/182 123/446 |
| 5,645,225 | A * | 7/1997 | Hasegawa | F02M 61/18 239/533.12 |
| 6,000,628 | A * | 12/1999 | Lorraine | F02M 51/0671 123/499 |
| 6,050,096 | A * | 4/2000 | Senior | F23C 7/004 239/463 |
| 6,422,199 | B1 | 7/2002 | Buckley | F02M 45/086 123/299 |
| 6,467,702 | B1 * | 10/2002 | Lambert | F02M 45/086 239/533.12 |
| 6,811,093 | B2 * | 11/2004 | Rado | F02M 51/0603 239/102.2 |
| 7,458,364 | B2 | 12/2008 | Allen | |
| 7,581,686 | B2 * | 9/2009 | Holzgrefe | F02M 51/0603 239/102.2 |
| 8,496,191 | B2 * | 7/2013 | Grant | F02M 45/086 239/423 |
| 2002/0000483 | A1 * | 1/2002 | Shoji | F02B 23/0669 239/533.2 |
| 2002/0043574 | A1 * | 4/2002 | Hunkert | F02M 61/1806 239/533.3 |
| 2004/0011890 | A1 * | 1/2004 | Heinecke | F02M 61/1806 239/533.2 |
| 2004/0178287 | A1 * | 9/2004 | Okamoto | F02M 51/0671 239/596 |
| 2005/0145713 | A1 * | 7/2005 | Reiter | F02M 51/0607 239/88 |
| 2005/0224606 | A1 * | 10/2005 | Dingle | F02B 19/14 239/533.2 |
| 2006/0124763 | A1 * | 6/2006 | Hertweck | F02M 61/042 239/88 |
| 2006/0208108 | A1 * | 9/2006 | Kato | F02M 61/184 239/533.3 |
| 2010/0116243 | A1 * | 5/2010 | Koyama | F02D 41/345 123/299 |
| 2015/0345453 | A1 * | 12/2015 | Schneider | F02M 61/1833 123/445 |
| 2017/0175667 | A1 * | 6/2017 | Zhang | F02D 41/38 |
| 2017/0204826 | A1 * | 7/2017 | Zhang | F02D 41/38 |
| 2017/0314491 | A1 * | 11/2017 | John | F02D 41/20 |
| 2017/0342938 | A1 * | 11/2017 | Zhang | F02M 45/08 |
| 2018/0058405 | A1 * | 3/2018 | Zhang | B05B 1/1663 |
| 2018/0100709 | A1 * | 4/2018 | Gopal | F28D 20/02 |

FOREIGN PATENT DOCUMENTS

| | | | | |
|---|---|---|---|---|
| FR | 2860557 | A1 * | 4/2005 | ......... F02M 51/0671 |
| WO | 9712178 | A1 | 4/1992 | |

OTHER PUBLICATIONS

Gopal, Ravi, "Dual Loop Cooling System Energy Storage and Reuse," U.S. Appl. No. 15/287,525, filed Oct. 2, 2016, 45 pages.

* cited by examiner

FUEL INJECTOR WITH VARIABLE FLOW DIRECTION

FIELD

The present invention relates to fuel injectors, and in particular to a fuel injector having a nozzle configuration to selectively inject fuel at differing angles in accordance with a height of a piston in a combustion chamber.

BACKGROUND/SUMMARY

During the operation of combustion engines the quality of the combustion events depends on various conditions. One condition is how well the fuel is mixed with air in the combustion chamber. A poor air fuel mix may yield unwanted soot, and/or hydrocarbon emissions. This may be, in particular, during cold starts. One contributing factor to poor mixing is fuel impingement onto the top surface of surface of the piston as it moves within the combustion chamber. Long spray penetration, may result in the spray hitting the top surface of the piston, which may tend to keep the fuel at a cooler, liquefied, state. Fuel injectors have been used to inject fuel at high velocity in an attempt to atomize the fuel. Still, impingement onto the surface of the piston may still occur.

U.S. Pat. No. 7,458,364 to Allen discloses a fuel injection system wherein an attempt is made to improve atomization. The '364 disclosure includes a so called mixing chamber into which a positive displacement pump injects a measured amount of fuel. An air, or exhaust gas, conduit provides a gaseous make-up volume to the mixing chamber as a partial vacuum is produced in the adjacent combustion chamber to pull exhaust gas and fuel into the combustion chamber in a combined stream in an attempt to entrain the fuel into the exhaust stream. The vacuum is created in the combustion chamber by delaying the opening of an inlet valve as the piston starts a downward stroke. The mixing chamber includes an atomizing nozzle at an outlet side thereof, to accelerate the flow.

This approach has a number of shortcomings. For one, the '364 system requires a very particular operation of the charge air inlet valve in order to create a vacuum in the combustion chamber to cause air or exhaust to flow through the mixing chamber to entrain the fuel. The '364 design is intended to be used with smaller single cylinder engines that do not include a fuel pump. The positive displacement pump is designed for metered injection, not for increased pressure. In addition, there appears to be a relatively short time during which the fuel is exposed to the passing air or exhaust flow. There also appears to be little time for any appreciable heat transfer between the fuel and exhaust. The stream of exhaust and stream of fuel appear to be merely blended. It appears the fuel only becomes atomized as it passes from the atomizing nozzle into the combustion chamber within the blend.

The inventors herein disclose an engine, a fuel injector, and a method of injecting fuel into a combustion chamber of the engine that reduces the likelihood of impingement of the injected fuel onto the top surface of the piston, and provides an improved air-fuel mixture.

Embodiments may provide a fuel injector including an injector body defining a cavity on an inside thereof and an outside surface. The injector body may have a central axis. One or more passages may pass from an inlet at the cavity through the outside surface. Each of the one or more passages may have a first inner contour forming a first angle with the injector body central axis, and a second inner contour forming a second angle with the injector body central axis. An injector pin may define a fuel pass-though volume movable within the cavity to selectively overlap an outlet of the pass-through volume with inlet of the one or more passages to selectively direct fuel in varying quantities along one or both of the first inner contour and the second inner contour. In this way, at or during, for example, an early segment of a compression stroke, when the piston may be low, and relatively far from the injector, the injected spray may have a relatively deep penetration angle; and also in this way at or during, for example, a late segment of the compression stroke, when the piston may be high, and relatively close to the injector, the injected spray may have a shallow, or zero, penetration angle.

In some examples a high pressure fuel may be delivered from a high pressure reservoir and/or fuel pump or the like, to the injector nozzle(s) through an internal fuel passage inside the injector body. The pressurized fuel may pass through one or more pass-through volumes. The fuel may pass through a fuel conjunction volume and/or one or more fuel side volumes. The fuel side volumes, or pass-through volumes, may be positioned to face or overlap injector nozzles. Each nozzle may have, for example, an annulus inlet and a circular outlet with a solid cone inside and mounted by, for example, four support legs. The inlet annulus area may be equal to the circular outlet area. The ratio of the outlet diameter d1 to inlet diameter d2 may be used to control the range of the injection spray angle. In this way, an amount of overlap may be selectively controlled by, for example, an engine controller in accordance with piston position, and, in this way, may vary an amount of spray penetration.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
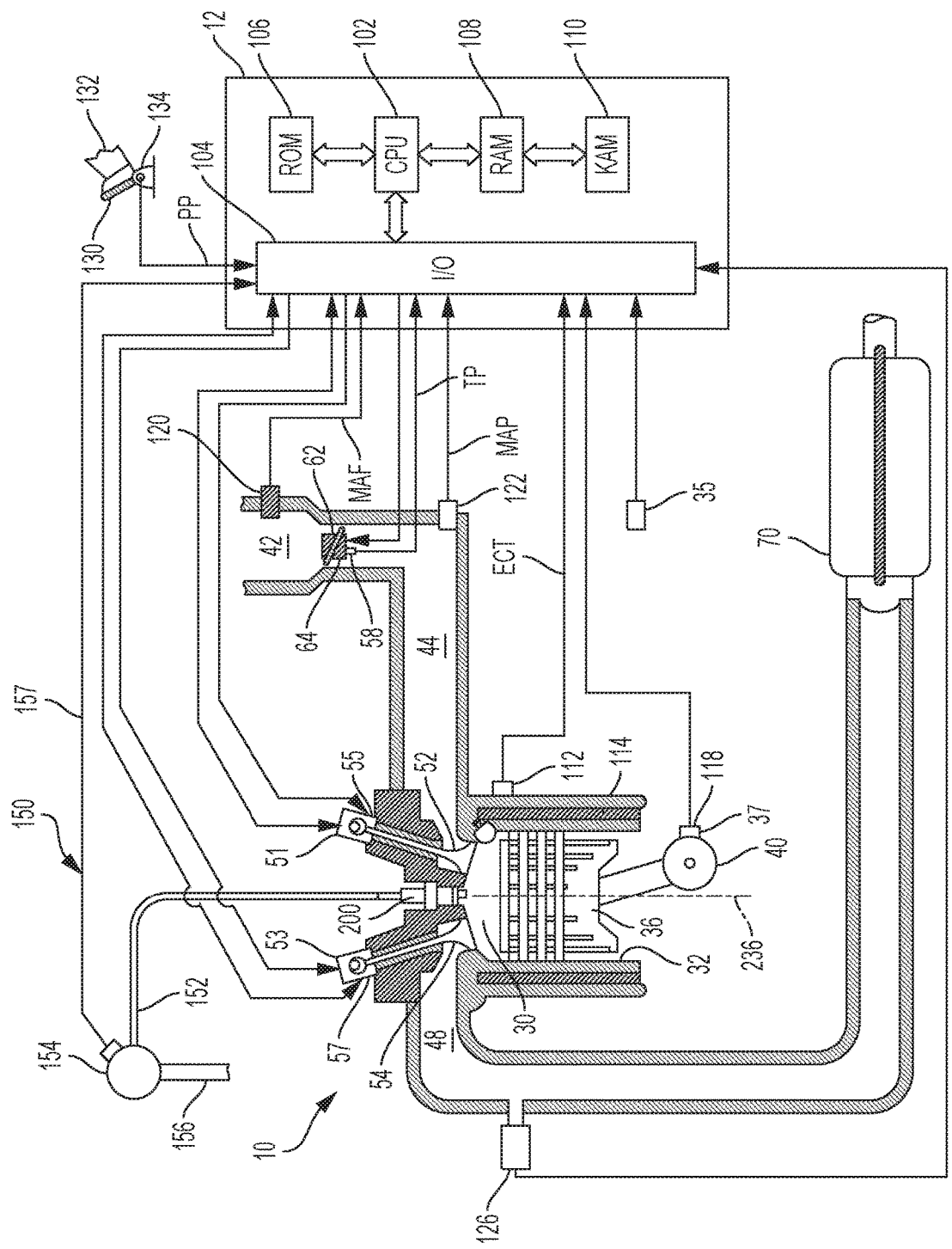
FIG. 1 is a schematic system diagram of an engine in accordance with the present disclosure.
Figure 3:
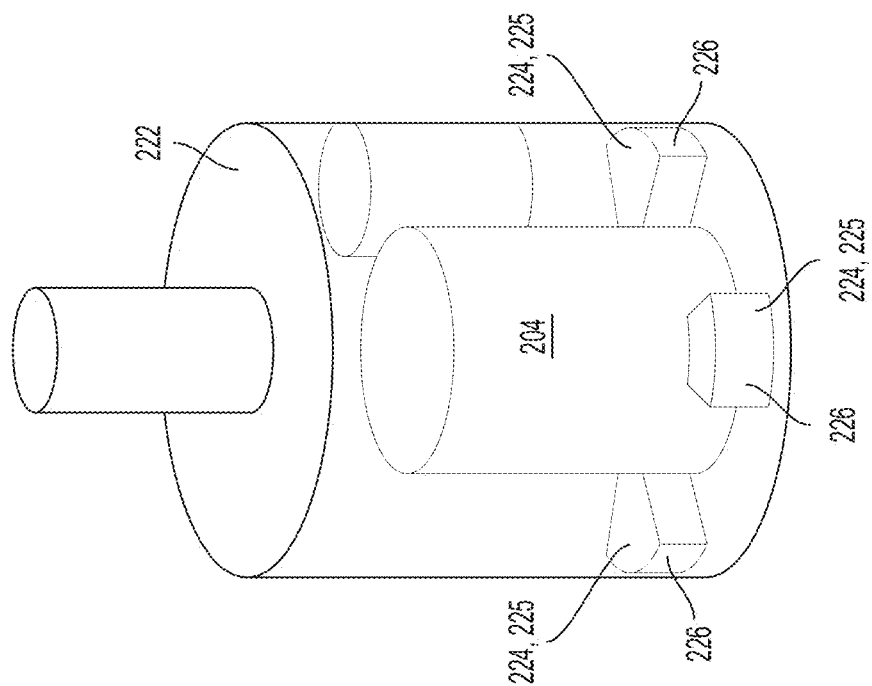
FIG. 3 is a perspective view of a valve insert positionable into the cavity shown in the valve body illustrated in FIG. 2.
Figure 2:
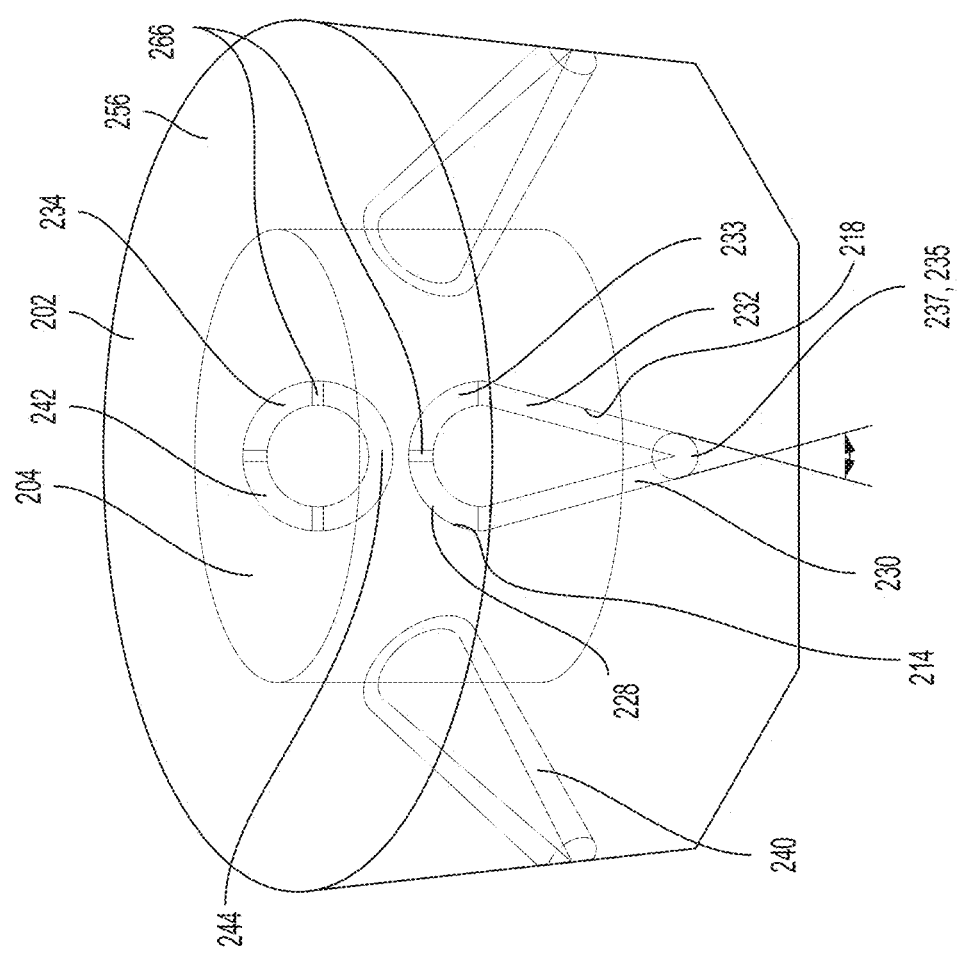
FIG. 2 is a perspective view of a valve body of a fuel injector in accordance with the present disclosure.
Figures 4A, 4B:
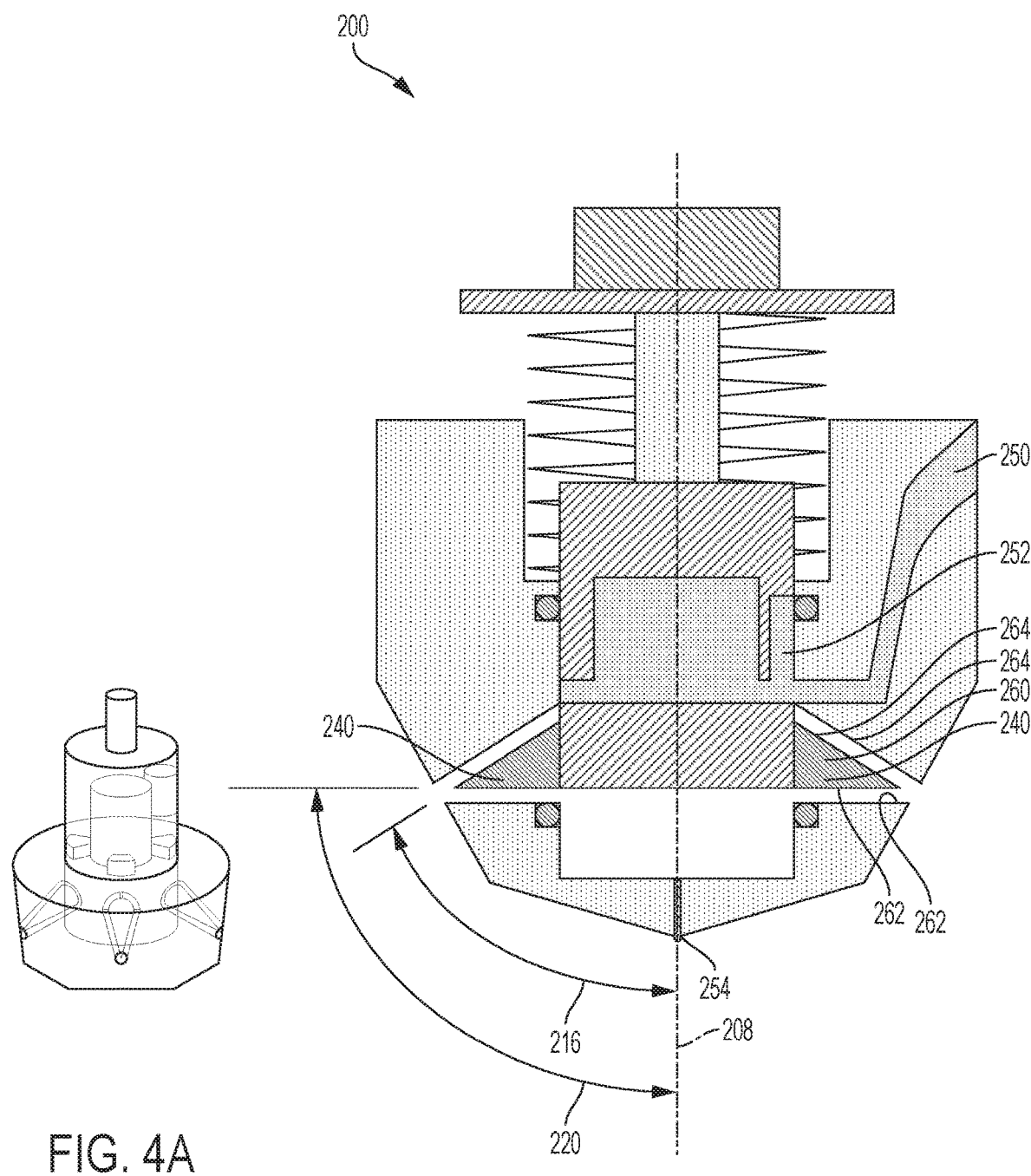
FIG. 4A is a perspective view and FIG. 4B is a cross-sectional view of the fuel injector shown in an "off" position, in accordance with the present disclosure.

Referring to FIG. 1, an internal combustion engine 10, comprising a plurality of cylinders, one cylinder of which is shown in FIG. 1, may be controlled by electronic engine controller 12. The engine 10 may include one or more combustion chambers 30 each defined substantially by a cylinder wall 32. A piston 36 may be positioned within the combustion chamber 30 for reciprocal motion therein, and connected to a crankshaft 40 to transmit a motive force created by movement of the piston 36. A flywheel (not shown) may be coupled to the crankshaft 40. A piston position sensor 37 is illustrated positioned in conjunction with the crankshaft 40, to sense, and/or otherwise determine the height, or position, of the piston 36 in the cylinder, i.e. the combustion chamber 30. A signal indicative of the distance between the piston 36 and the fuel injector 200 may be sent to the engine controller 12.

The combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 200 is shown positioned to inject fuel directly into cylinder 30, which is known to those skilled in the art as direct injection. Alternatively, fuel may be injected to an intake port, which is known to those skilled in the art as port injection. Fuel injector 200 may deliver a liquid fuel in proportion to the pulse width of signal from controller 12. Fuel is delivered to fuel injector 200 a fuel system 150 including a fuel tank, (not shown) fuel pump 154, and fuel rail (not shown).

Intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

An ignition system (not shown) may provide an ignition spark to combustion chamber 30 via spark plug (not shown) in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126. In another example, the engine may be coupled to an electric motor/battery system in a hybrid vehicle. The engine 10 may be a diesel engine, and may not utilize a spark, or ignition system, as is illustrated in the example engine 10 shown in FIG. 1.

Catalytic converter 70 may include multiple catalyst bricks, in one example. In another example, multiple emission control devices, each with multiple bricks, can be used. Catalytic converter 70 can be a three-way type catalyst in one example. A temperature of catalytic converter 70 may be measured or estimated via engine speed, engine load, engine coolant temperature, and spark timing.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; a measure of road grade from inclinometer 35, and a measurement of throttle position from sensor 58. Barometric pressure may also be sensed (sensor not shown) for processing by controller 12.

In a preferred aspect of the present description, engine position sensor 118 produces a predetermined number of equally spaced pulses every revolution of the crankshaft from which engine speed (RPM) can be determined. The engine position sensor 118 and the position location sensor 37 may be the same sensor.

During operation, each cylinder within engine 10 may typically undergo a four stroke cycle: the cycle may include the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber 30. In a process hereinafter referred to as ignition. The fuel may be combusted via auto ignition via increases compression. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Controller 12 may be configured to receive inputs from engine 10, as shown in more detail in FIG. 1, and accordingly control a torque output of the engine and/or operation of the torque converter, transmission, DISG, clutches, and/or brakes. In the case of a diesel engine, controller 12 may control the engine torque output by controlling a combination of fuel pulse width, fuel pulse timing, and air charge.

Engine control may be performed on a cylinder-by-cylinder basis to control the engine torque output.

As mentioned the engine 10 may include a fuel system 150. A fuel line 152 may be included to supply a high pressure fuel for combustion in the combustion chamber 30. The engine system 150 may include a fuel pump 154 configured to move fuel from a fuel tank (not shown) via an upstream fuel line 156. The fuel pump 154 may also pressurize the fuel to thereby provide the high pressure fuel. A fuel control line 157 may operatively couple the fuel pump 156 with the controller 12.

The engine 10 may include an EGR system (not shown). An exhaust gas recirculation (EGR) line and EGR valve may be provided to at least partially regulate the EGR system.

Figures 7A, 7B:
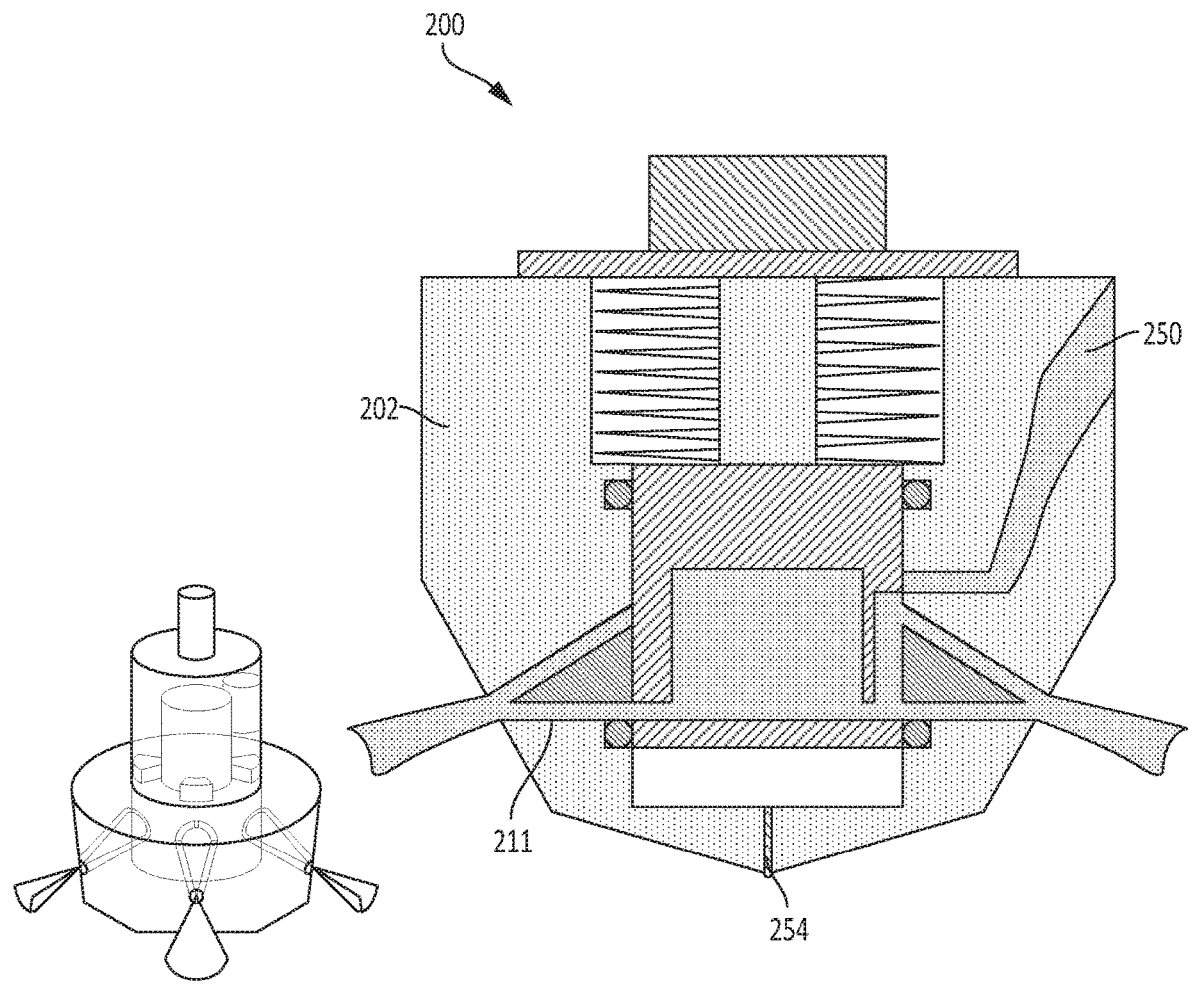
FIG. 7A is a perspective view and FIG. 7B is a cross-sectional view of the fuel injector shown in a "third" position, in accordance with the present disclosure.
Figure 8:
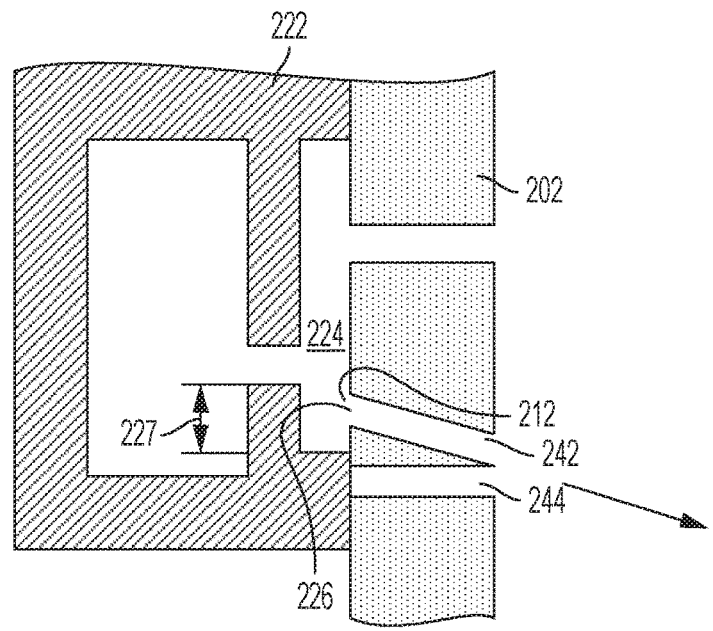
FIG. 8 is a cross-sectional view of a portion of an example fuel injector in accordance with the present disclosure.
Figure 9:
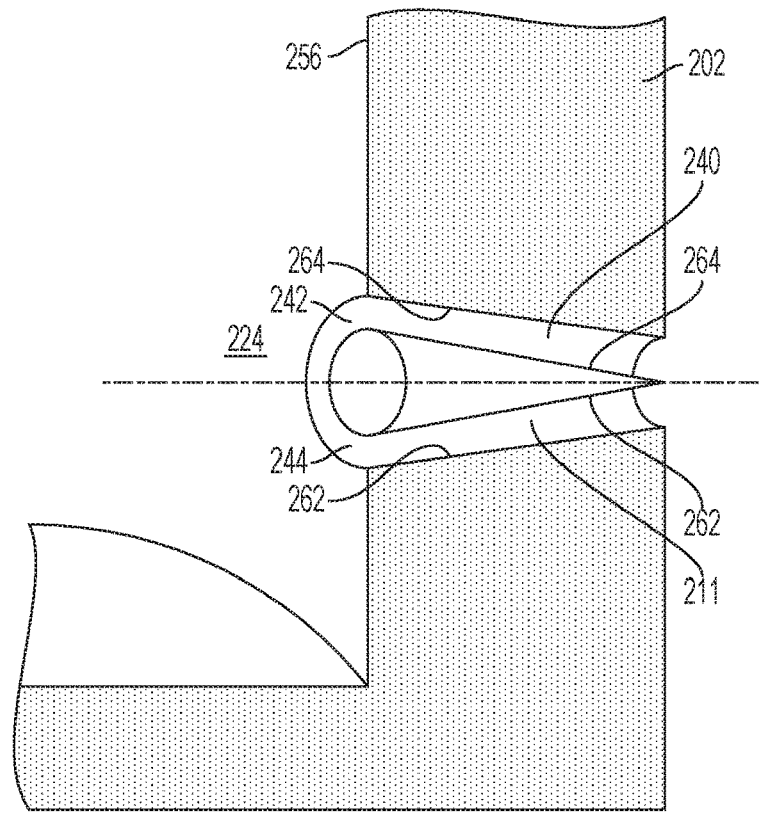
FIG. 9 is a mostly cross-sectional view of a portion of an example cone shaped insert in positionable into the valve opening in accordance with the present disclosure.

Referring now also to FIGS. 2-9, wherein a fuel injector 200 in accordance with the present disclosure is illustrated. The fuel injector 200 may include an injector body 202 defining a cavity 204 on an inside thereof, and an outside surface 206. The injector body may have a central axis 208. One or more passages 210 may pass from an inlet 212 at the cavity 204 through to the outside surface 206. The one or more passages 210 may each have a first inner contour 214 forming a first angle 216 with the injector body central axis 208, and a second inner contour 218 forming a second angle 220 with the injector body 202 central axis 208. The fuel injector 200 may also include an injector pin 222 defining a fuel pass-though volume 224 movable within the cavity 204 to selectively overlap an outlet 226 of the pass-through volume 224 with the inlet of the one or more passages 210 to selectively direct fuel in varying quantities along one or both of the first inner contour 214 and the second inner contour 218. FIG. 8 illustrates an overlap 227 as a dimension arrow. The amount of, or size of, overlap 227 may be variable in accordance with movement of the insert 222 relative to the injector body 202. The effected overlap 227 may be selectively adjusted in accordance with a position of a piston 36 in a combustion chamber 30 into which the fuel injector is installed.

The one or more pass-through volumes may be referred to as one or more side volumes, in particular when it, or they, are located to the side of a central volume. The pass-through volume may be one or more volumes through which fuel may pass from a fuel source, for example a fuel line 152 (FIG. 1) through the outlet 226. In the example illustrated in FIGS. 2-7 the pass-through volume 224 is illustrated as four fuel side volumes 224.

The first inner contour 214 may be along a first portion 228 of a conical wall 230 defining the one or more passages 210. The second inner contour 218 may be along a second portion 232 of the conical wall 230.

The inlet 212 may have an annular cross-section 234 and the one or more passages 210 may have a circular outlet 237. The inlet 212 may have a first cross-sectional area 233, and the circular outlet 237 may have a second cross-sectional area 235. The first and second cross-sectional areas 233, 235 may be substantially equal although they may not be.

The injector pin 222 may be configured to move and selectively direct the fuel in selective proportions in the first angle 216 and the second angle 220 in accordance with a distance between the fuel injector 200 and a piston 36 configured for reciprocal movement within a combustion chamber 30 for combustion of fuel injected from the fuel injector 200. The central axis 208 may substantially align with a combustion chamber axis 236 into which the fuel injector 200 is configured to inject fuel at the first angle 216 when a piston 36 in the combustion chamber 30 is relatively far from the injector and to inject fuel at the second angle 220 when the piston is relatively close to the fuel injector 200.

The one or more passages 210 may be one or more conical passages 210. A conical insert 240 may be disposed within each of the one or more conical passages 210.

Figures 5A, 5B:
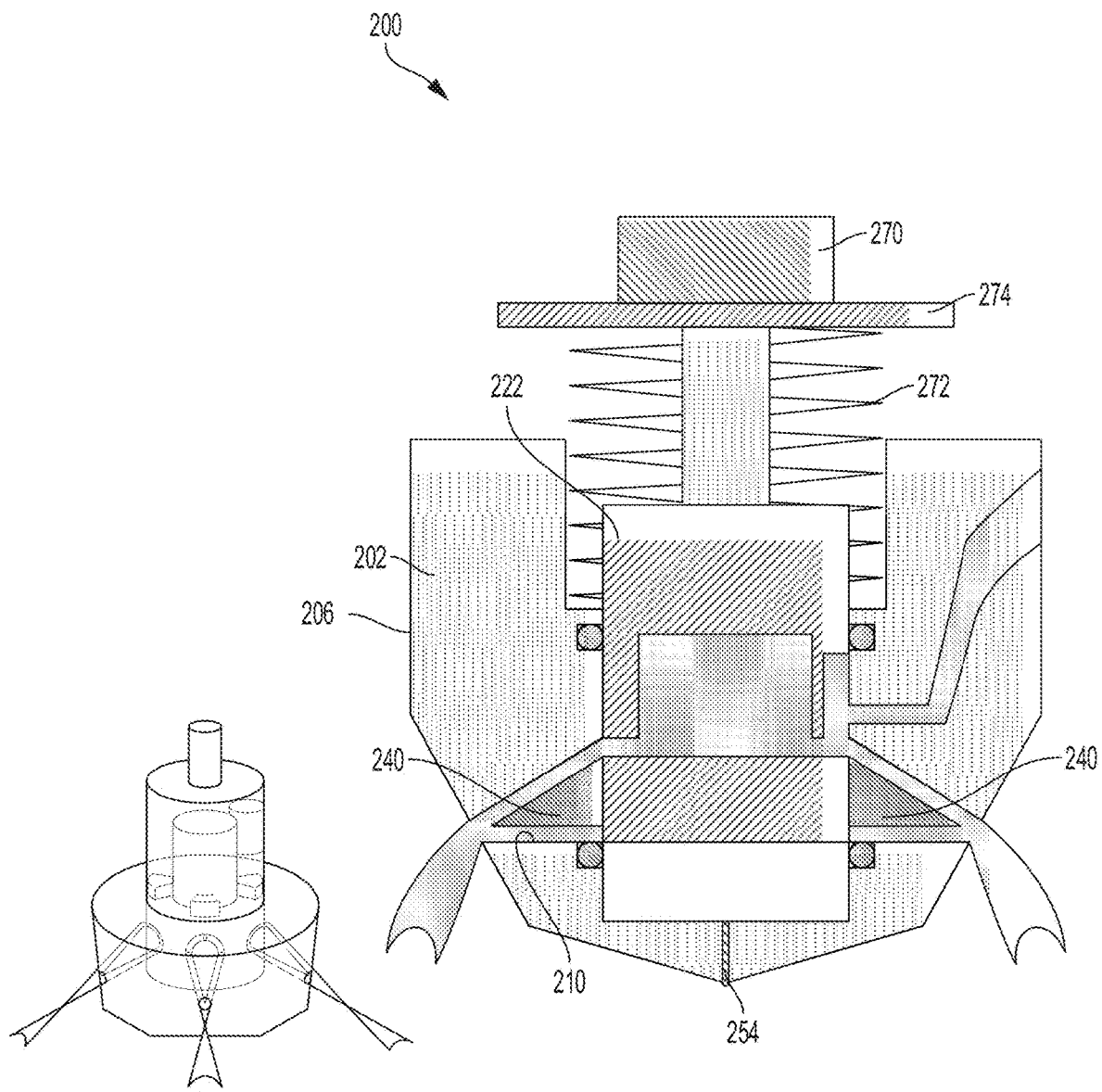
FIG. 5A is a perspective view and FIG. 5B is a cross-sectional view of the fuel injector shown in a "first" position, in accordance with the present disclosure.

The injector body 202 may be position-able in a fixed predetermined relationship with a central axis 236 of a combustion chamber 30 having a piston 36 disposed for reciprocating movement therein. The one or more passages 210 may be annular passages 211. Each passage 210 may have a first channel portion 242 directed at a first angle 216 with the central axis 236 of the combustion chamber 30 disposed to receive fuel for injection into the combustion chamber 30 during a first increment of injector pin 222 movement (FIGS. 5A-5B). A second channel portion 244 may be directed at a second angle 220 with the central axis 236 of the combustion chamber 30 disposed to receive fuel for injection into the combustion chamber 30 during a second increment of injector pin 222 movement (FIGS. 7A-7B).

Figures 6A, 6B:
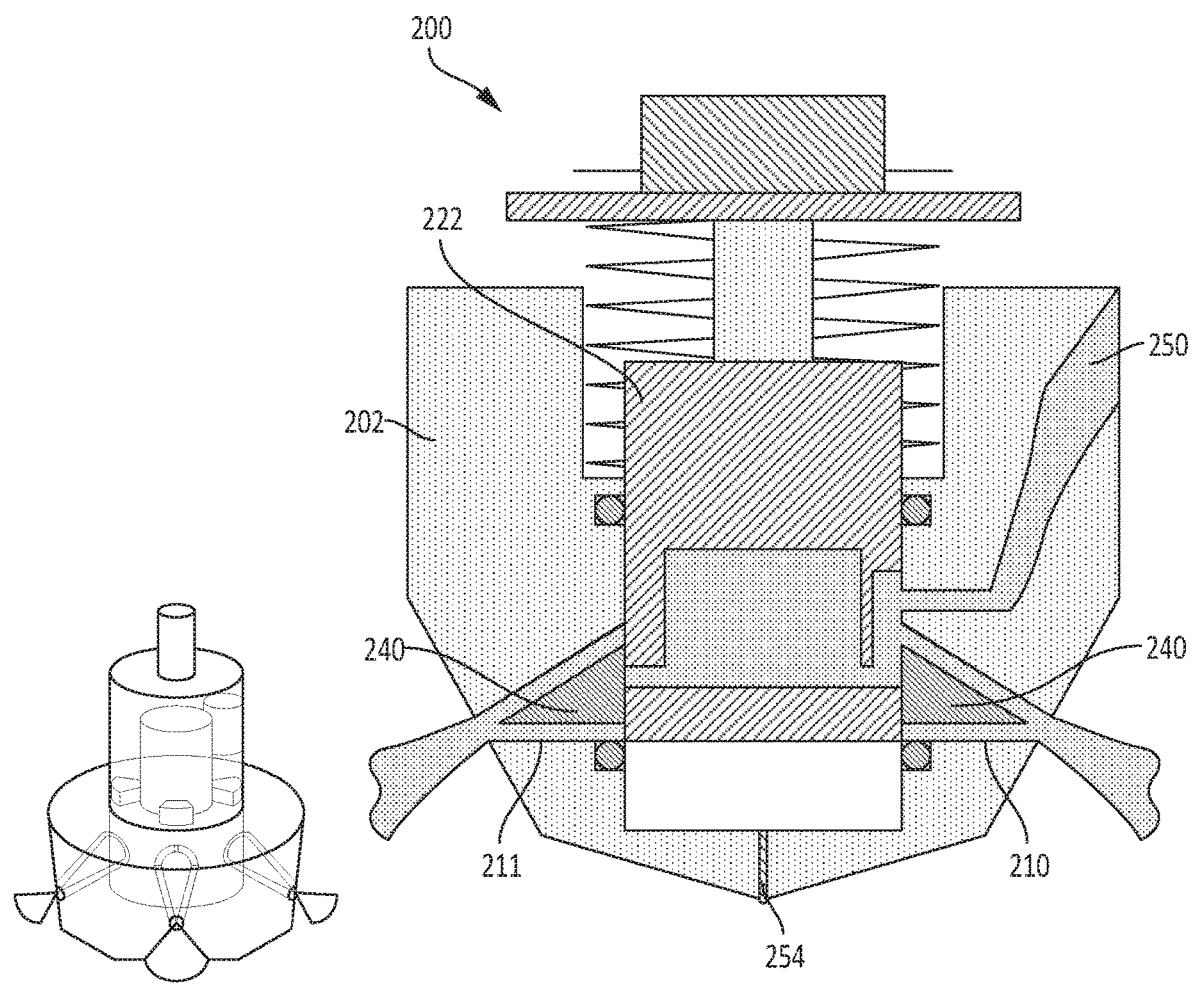
FIG. 6A is a perspective view and FIG. 6B is a cross-sectional view of the fuel injector shown in a "second" position, in accordance with the present disclosure.

Embodiments may include a controller 12 to control injection of fuel into a combustion chamber 30 including a piston 36 disposed for reciprocating movement therein. The fuel may be injected at the first angle when the piston is at an early segment of a compression stroke (FIGS. 5A-5B). The fuel may also be injected at the second angle 216 when the piston 36 is at a late segment of the compression stroke (FIGS. 7A-7B). The fuel may also be injected at an intermediate angle between the first and second angles when the piston is at an intermediate segment of the compression stroke between the early and late segments of the stroke (FIGS. 6A-6B).

The fuel injector 200 may include an internal fuel passage 250 defined in the injector body 202 to fluidically couple a high pressure fuel source to the pass-through volume 224 via a fuel conjunction volume 252. The pass-through volume(s) 224 in some cases may be side volumes 225. The one or more passages 210 may be multiple conical passages spaced at substantially equal increments circumferentially on the outer surface each having annular cross-sections 234 of progressively decreasing outer and inner diameters.

The fuel injector may also include an air flow path 254 providing fluid passage from the cavity 204 to an outside of the injector body to reduce air pressure resistance to the movement of the injector pin within the cavity 204.

Embodiments provide a fuel injector 200 for an internal combustion engine 10. The internal combustion engine 10 may include an injector body 202 including an interior cavity 204 surrounded by a wall 256. Conical passages 210 may pass through the wall 256. Each passage 210 may have a relatively wider inlet 212 at the cavity 204.

A conical insert 240 may be supported inside each conical passage 210 defining annular passages 211 between the respective conical passages 210 and the conical inserts 240. An injector pin 222 may define one or more pass-through volumes therein. Each of the one or more pass-through volumes may be fluidically coupled with a fuel source 156 and may have an outlet 226. The injector pin 222 may be movable relative the injector body to effect selective overlap 227 of the outlet 226 with the inlet 212 of the passages 210 (FIG. 8).

The first channel portion 242 may be defined as a circumferential range or angular measure or the like to describe substantially less than one half of the annular channel; for example, without limitation, one quarter, or one eighth of the total annular cross-section, or 45 degrees or 10 degrees. The channel portions 242, 244 may be defined by a chord line extending between two points on a circumferential arc on the inside surface of the passage wall. The chord line may intersect a circumferential arc on the outside surface of the insert. The channel portion may then be described to pass through an area subtended by selected combinations of the described chord lines and arcs.

The conic elements, i.e. passages 210 or inserts 240, may be right cones having equal length slants on all sides, or they may be oblique cones having a relatively long slant on one side and a relatively short slant on the other side as illustrated in the figures. The conical passages 211 and the conical inserts 240 may each define respective oblique cones 260 having a short slant 262 circumferentially opposite a long slant 264. The short slant may be oriented substantially perpendicular to a central axis 236 of the combustion chamber 30. The long slant 264 may form an acute angle 216 with the central axis 236 of the combustion chamber 30.

Support legs 266 may be configured to support the conical inserts 240 inside the conical passages 240 in spaced apart relation to form the annular passages 211. The support legs 266 may be evenly spaced circumferentially, or arranged in any pattern. The example illustrated shows four support legs 266, evenly spaced.

Embodiments may include an actuator 270, for example an electric actuator coupled with a spring 272 via a spring holder 274 (FIG. 5B). A communication coupling (not shown) for operatively coupling with an engine controller may be included. An injector actuator operatively may be coupled with the communication coupling.

Various embodiments may provide a method of or for injecting fuel into a combustion chamber of an engine. The method may include moving a fuel source pass-through volume past a first portion of an annular inlet of an injector nozzle passage and allowing a pressurized fuel to forcibly pass through the passage in a first direction. The method may also include continuing to move the fuel source pass-through volume past the first portion of an annular inlet of the injector nozzle passage and allowing the pressurized fuel to forcibly pass through the passage in a second direction.

In some example embodiments the moving and the continued moving of the fuel source pass-through volume 224 may be controlled in accordance with a movement of a piston 36 within the combustion chamber 30. The accorded moving and continued moving may include causing the fuel to pass predominantly between a long slant of an oblique conical passage and a long slant of an oblique conical insert in the first direction when the piston is at an early segment of a compression stroke (FIGS. 5A-5B). The moving and continued moving may include causing the fuel to pass predominantly between a short slant of the oblique conical passage and a short slant of the oblique conical insert in the second direction when the piston is at a late segment of the compression stroke (FIGS. 7A-7B). Between the early and late segments of the compression stroke the fuel may pass through, or along both the long slant and the short slant in a mixed, or combined, fashion when the piston is at an intermediate segment of the compression stroke between the early and late segments (FIGS. 6A-6B).

In some example embodiments the moving and the continued moving of the fuel source pass-through volume 224 may includes moving an injector pin 222, housing the pass-through volume 224 therein, relative to an injector body 202.

FIGS. 1-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It will be appreciated by those skilled in the art that although the present disclosure has been described by way of example with reference to one or more embodiments it is not limited to the disclosed embodiments and that one or modifications to the disclosed embodiments or alternative embodiments could be constructed without departing from the scope of the present disclosure.

Accordingly, it will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fuel injector comprising:
   an injector body defining a cavity on an inside thereof and having an outside surface, the injector body having a central axis and a first passage passing from an inlet at the cavity through to the outside surface, the first passage having:
      a first inner contour forming a first angle with the central axis, and
      a second inner contour forming a second angle with the central axis; and
      an injector pin defining a fuel pass-through volume movable within the cavity to selectively overlap an outlet of the fuel pass-through volume with the inlet of the first passage to selectively direct fuel in varying quantities along one or both of the first inner contour and the second inner contour; and
   the injector body having at least a second passage passing from a second inlet at the cavity through to the outside surface, wherein the first passage has a circular outlet and the inlet of the first passage has with an annular cross-section.

2. The fuel injector of claim 1, wherein the first inner contour is along a first portion of a conical wall defining the first passage, and the second inner contour is along a second portion of the conical wall.

3. The fuel injector of claim 1, wherein the inlet of the first passage has a first cross-sectional area, and the circular outlet of the first passage has a second cross-sectional area, wherein the first and second cross-sectional areas are equal.

4. The fuel injector of claim 1, wherein the injector pin is configured to move and selectively direct the fuel in selective proportions in the first angle and the second angle in accordance with a distance between the fuel injector and a piston configured for reciprocal movement within a combustion chamber for combustion of fuel injected from the fuel injector.

5. The fuel injector of claim 1, wherein the central axis aligns with a combustion chamber axis into which the fuel injector is configured to inject fuel at the first angle when a piston in a combustion chamber is relatively far from the fuel injector and to inject fuel at the second angle when the piston is relatively close to the fuel injector.

6. The fuel injector of claim 1, wherein the first passage is a conical passage.

7. The fuel injector of claim 6, further comprising a conical insert disposed within the conical passage.

8. The fuel injector of claim 1, wherein the injector body is positionable in a fixed predetermined relationship with a central axis of a combustion chamber having a piston disposed for reciprocating movement therein;
   the first passage being an annular passage, having:
      a first channel portion directed at a first combustion chamber angle with the central axis of the combustion chamber disposed to receive fuel for injection into the combustion chamber during a first increment of injector pin movement; and
      a second channel portion directed at a second combustion chamber angle with the central axis of the combustion chamber disposed to receive fuel for injection into the combustion chamber during a second increment of injector pin movement.

9. The fuel injector of claim 1, further comprising a controller to control injection of fuel into a combustion chamber including a piston disposed for reciprocating movement therein, the fuel being injected:
   at the first angle when the piston is at an early segment of a compression stroke;
   at the second angle when the piston is at a late segment of the compression stroke; and
   at an intermediate angle between the first and second angles when the piston is at an intermediate segment of the compression stroke between the early and late segments.

10. The fuel injector of claim 1, further comprising an internal fuel passage defined in the injector body to fluidically couple a high pressure fuel source to the fuel pass-through volume via a fuel conjunction volume.

11. The fuel injector of claim 1, wherein a plurality of passages includes the first and second passages and the plurality of passages are conical passages spaced at equal increments circumferentially on the outside surface each having annular cross-sections of progressively decreasing outer and inner diameters.

12. The fuel injector of claim 1, further comprising an air flow path providing fluid passage from the cavity to an outside of the injector body to reduce air pressure resistance to movement of the injector pin within the cavity.

13. A fuel injector for an internal combustion engine comprising:
   an injector body including an interior cavity surrounded by a wall and conical passages passing through the wall each having a relatively wider inlet at the interior cavity;
   a conical insert supported inside each conical passage defining annular passages within the respective conical passages; and
   an injector pin defining pass-through volumes therein, the pass-through volumes fluidically coupled with a fuel source and having an outlet, the injector pin movable relative the injector body to adjust overlap of each outlet with a respective inlet of the conical passages.

14. The fuel injector of claim 13, wherein the conical passages and the conical inserts each define respective oblique cones having a short slant circumferentially opposite a long slant, the short slant oriented perpendicular to a central axis of a combustion chamber and the long slant forming an acute angle with the central axis of the combustion chamber.

15. The fuel injector of claim 14, further comprising support legs configured to support the conical inserts inside the conical passages in spaced apart relation to form the annular passages.

16. The fuel injector of claim 14,
   wherein the effected overlap is selectively adjusted in accordance with a position of a piston in the combustion chamber into which the fuel injector is installed.

17. A method of injecting fuel into a combustion chamber of an engine comprising:
   moving a fuel source pass-through volume past a first portion of an annular inlet of an injector nozzle passage comprised of a conical insert within a conical passage defining an annular passage between the conical passage and the conical insert;

the injector nozzle passage passing through a wall surrounding an interior cavity of an injector body;
directing a fuel in a first direction; and
continuing to move the fuel source pass-through volume past the first portion of the annular inlet of the injector nozzle passage and directing the fuel in a second direction.

18. The method of claim 17, wherein the moving and the continued moving of the fuel source pass-through volume is controlled in accordance with a movement of a piston within the combustion chamber, and includes:
causing the fuel to pass predominantly between a long slant of an oblique conical passage and a long slant of an oblique conical insert in the first direction when the piston is at an early segment of a compression stroke; and
causing the fuel to pass predominantly between a short slant of the oblique conical passage and a short slant of the oblique conical insert in the second direction when the piston is at a late segment of the compression stroke.

19. The method of claim 17, wherein the moving and the continued moving of the fuel source pass-through volume includes:
moving an injector pin, housing the fuel source pass-through volume therein, relative to the injector body.

\* \* \* \* \*